(12) United States Patent
Babazadeh et al.

(10) Patent No.: US 9,325,242 B2
(45) Date of Patent: Apr. 26, 2016

(54) SWITCHING REGULATOR OUTPUT CAPACITOR CURRENT ESTIMATION

(75) Inventors: Amir Babazadeh, Irvine, CA (US); Benjamim Tang, Rancho Palos Verdes, CA (US); Kenneth Ostrom, Palos Verdes Estates, CA (US)

(73) Assignee: Infineon Technologies Austria AG, Villach (AT)

( * ) Notice: Subject to any disclaimer, the term of this patent is extended or adjusted under 35 U.S.C. 154(b) by 306 days.

(21) Appl. No.: 13/537,856

(22) Filed: Jun. 29, 2012

(65) Prior Publication Data

US 2014/0002044 A1    Jan. 2, 2014

(51) Int. Cl.
G05F 1/00    (2006.01)
H02M 3/158    (2006.01)
H02M 1/00    (2007.01)

(52) U.S. Cl.
CPC .......... H02M 3/1588 (2013.01); *H02M 3/1584* (2013.01); *H02M 2001/0009* (2013.01); *Y02B 70/1466* (2013.01)

(58) Field of Classification Search
CPC ................ H02M 3/156–3/158; H02M 3/1563; H02M 3/1582; H02M 3/1584; H02M 3/1588; H02M 3/33507; H02M 2001/0009; H02M 2001/0012; H02M 2001/0032; H02J 1/02
USPC ........................... 323/271–272, 282–286, 289
See application file for complete search history.

(56) References Cited

U.S. PATENT DOCUMENTS

| | | | |
|---|---|---|---|
| 7,030,596 B1 * | 4/2006 | Salerno et al. ................. | 323/282 |
| 7,162,655 B2 | 1/2007 | McDonald et al. | |
| RE39,976 E * | 1/2008 | Schiff et al. ................... | 323/285 |
| 7,493,504 B2 * | 2/2009 | Chapuis ......................... | 713/300 |
| 7,919,955 B2 | 4/2011 | Tang et al. | |
| 8,054,058 B2 * | 11/2011 | Liu et al. ........................ | 323/284 |
| 8,148,967 B2 * | 4/2012 | Xing et al. ..................... | 323/288 |
| 8,159,205 B1 | 4/2012 | Latham, II et al. | |
| 8,319,486 B2 * | 11/2012 | Maksimovic et al. ........ | 323/283 |
| 8,618,788 B2 * | 12/2013 | Trivedi et al. ................. | 323/327 |
| 2002/0171985 A1 | 11/2002 | Duffy et al. | |
| 2009/0267580 A1 | 10/2009 | Derksen | |
| 2009/0310385 A1 | 12/2009 | Maksimovic et al. | |
| 2010/0127682 A1 | 5/2010 | Kenly et al. | |
| 2010/0188062 A1 | 7/2010 | Candage et al. | |
| 2011/0119513 A1 | 5/2011 | Krishnamurthy et al. | |

FOREIGN PATENT DOCUMENTS

CN          102244400 A     11/2011

OTHER PUBLICATIONS

IEEE 100 The Authoritative Dictionary of IEEE Standards Terms Seventh Editionm IEEE Std 100-2000, vol., no., p. 1001. 2000. URL: http://ieeexplore.ieee.org/stamp/stamp.jsp?tp=& arnumber=4116787&isnumber=4116786.*

* cited by examiner

*Primary Examiner* — Gary L Laxton
*Assistant Examiner* — Kevin H Sprenger
(74) *Attorney, Agent, or Firm* — Murphy, Bilak & Homiller, PLLC

(57) ABSTRACT

A switching regulator includes a controller and a power stage for coupling to a load through an inductor and a capacitor. The a controller is operable to control operation of the power stage via a pulse width modulation (PWM) signal generated based on a difference between a reference voltage and the load voltage and sample the inductor current at a lower rate than the load voltage. The controller is further operable to estimate the capacitor current based on the sampled load voltage, generate an offset to the reference voltage based on the sampled inductor current and the estimated capacitor current and adjust the PWM signal applied to the power stage based on the offset. The switching regulator can be single-phase or multi-phase.

22 Claims, 5 Drawing Sheets

US 9,325,242 B2

SWITCHING REGULATOR OUTPUT CAPACITOR CURRENT ESTIMATION

FIELD OF TECHNOLOGY

The present application relates to switching regulators, in particular output capacitor current estimation for switching regulators.

BACKGROUND

Electronic equipment such as microprocessors, graphics processors, network processors, digital signal processors, etc. must often respond very fast to large step-type load transients. Switching power converters preferably have a voltage response that follows the ideal target voltage closely while reducing ring back. A system with such a transient response often behaves well over a wide frequency range of load changes. Conventional switching regulators often provide adaptive voltage positioning (AVP) where the voltage is sampled at a high rate and the inductor current is sampled at a much lower rate. At load changes, the AVP loop introduces a high latency into the control system and causes ring back and unfavorable voltage response because of the low inductor current sampling rate. One of the benefits of AVP is that voltage excursions from periodic repetitive load steps are minimized, lowering the effective output impedance. Other switching regulators use high performance current ADCs (analog-to-digital converters) with high sampling rates and low latencies to minimize the delay in the current loop and force the loop to react as fast as possible. Such solutions are costly, require large area on the chip also consume more power.

SUMMARY

According to an embodiment of a method of operating a switching regulator having a power stage coupled to a load through an inductor and a capacitor, the method comprises: controlling operation of the power stage via a pulse width modulation (PWM) signal generated based on a difference between a reference voltage and the load voltage; sampling the inductor current at a lower rate than the load voltage; estimating the capacitor current based on the sampled load voltage; generating an offset to the reference voltage based on the sampled inductor current and the estimated capacitor current; and adjusting the PWM signal applied to the power stage based on the offset. The switching regulator can be single-phase or multi-phase, and the capacitor can be a single capacitor or a bank of capacitors in parallel.

According to an embodiment of a switching regulator, the switching regulator comprises a controller and a power stage for coupling to a load through an inductor and a capacitor. The controller is operable to control operation of the power stage via a PWM signal generated based on a difference between a reference voltage and the load voltage and sample the inductor current at a lower rate than the load voltage. The controller is further operable to estimate the capacitor current based on the sampled load voltage, generate an offset to the reference voltage based on the sampled inductor current and the estimated capacitor current and adjust the PWM signal applied to the power stage based on the offset. The switching regulator can be single-phase or multi-phase.

According to an embodiment of a multi-phase switching regulator, the multi-phase switching regulator comprises a controller and a power stage comprising a plurality of phases each of which is coupled to a load through a different inductor and an output capacitor. The controller is operable to sample a total inductor current for all of the phases at a lower rate than the load voltage, estimate the output capacitor current based on the sampled load voltage, and adjust a PWM signal applied to each phase based on the sampled total inductor current and the estimated output capacitor current.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide fast load transient response for switching regulators by using fast load voltage sampling instead of fast current ADCs. The fast load transient response techniques described herein can be applied to any switching regulator architecture, including: buck; boost; buck-boost; flyback; push-pull; half-bridge; full-bridge; and SEPIC (single-ended primary-inductor converter). A buck converter reduces a DC voltage to a lower DC voltage. A boost converter provides an output voltage that is higher than the input. A buck-boost converter generates an output voltage opposite in polarity to the input. A flyback converter generates an output voltage that is less than or greater than the input, as well as multiple outputs. A push-pull converter is a two-transistor converter especially efficient at low input voltages. A half-bridge converter is a two-transistor converter used in many off-line applications. A full-bridge converter is a four-transistor converter usually used in off-line designs that can generate very high output power. A SEPIC is a type of DC-DC converter allowing the electrical voltage at its output to be greater than, less than, or equal to that at its input.

For each type of switching regulator architecture, a fast load transient response is realized by providing a scaled estimation of the output capacitor current into the AVP loop. The output capacitor current estimate is generated based on the sampled load voltage instead of the sampled phase inductor current, the load voltage being sampled at a higher rate than the inductor current.

Described next are embodiments of the fast load transient response technique, explained in the context of a switched mode buck converter. Those skilled in the art will appreciate that the fast load transient response embodiments described herein can be readily applied to other switching regulator architectures with minor modifications, if any. Such modifications are well within the capability of one of ordinary skill in the art, without requiring undue experimentation.

Figure 1:
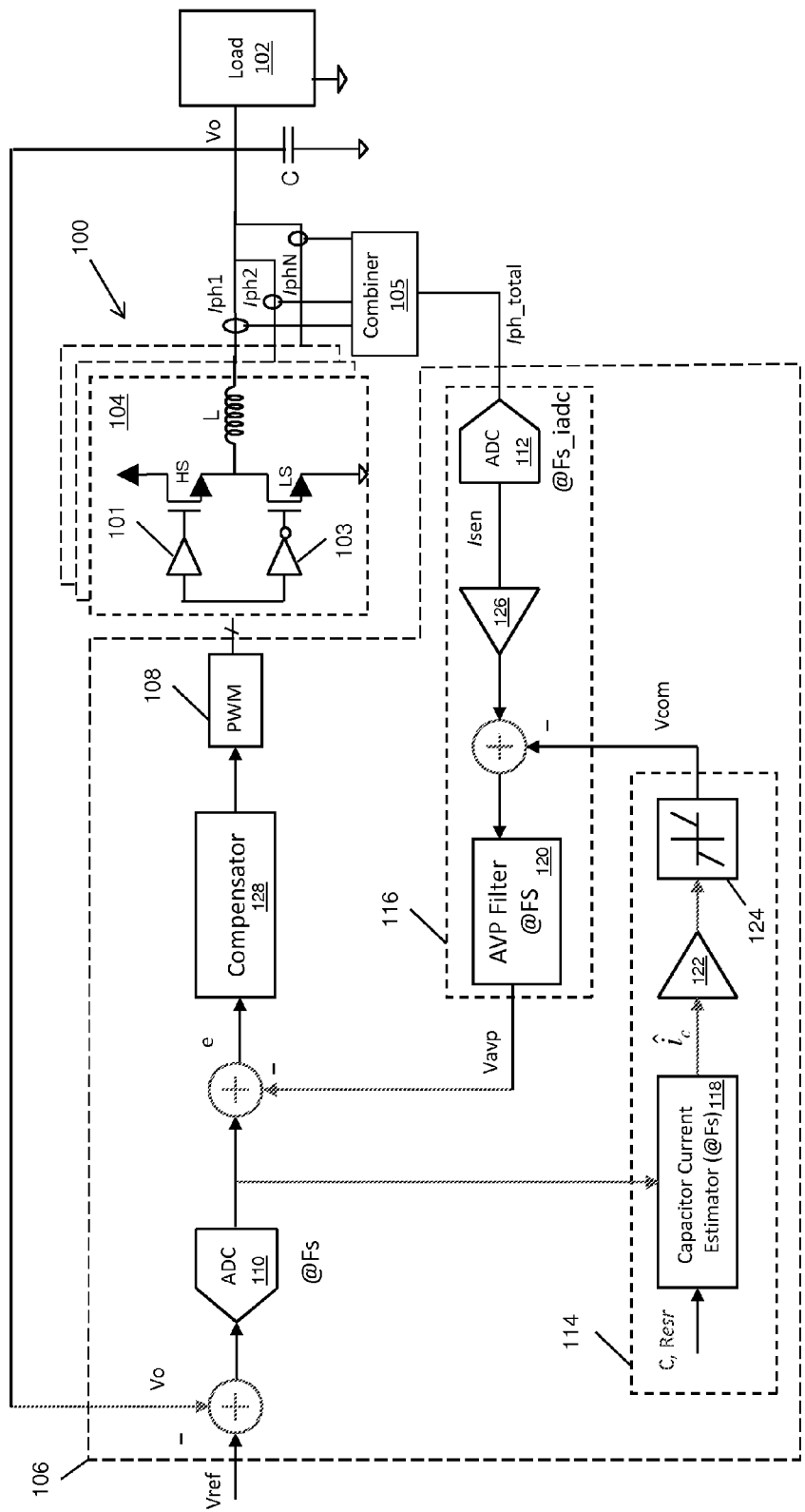
FIG. 1 illustrates a block diagram of an embodiment of a switching regulator having a fast load transient response.

FIG. 1 illustrates a block diagram of an embodiment of a switched mode buck converter which includes a power stage 100 coupled to a load 102 such as a microprocessor, graphics processor, network processor, digital signal processor, etc. The power stage 100 can have one or more phases 104 i.e. the switched mode buck converter can be a single-phase switching regulator where the load current is supplied by a single phase 104 or a multi-phase switching regulator where the load current is supplied by multiple phases 104. Each phase 104 of the power stage 100 includes a high-side transistor (HS) and a low-side transistor (LS) driven by corresponding drives 101, 103. Each phase 104 provides current (Iphm) to the load 102 through a different inductor (L). The amount of current provided by each phase 104 depends on the switch state of the high-side and low-side transistors for that phase 104. An output capacitor (C) is also coupled to the load 102, between the phase inductors and the load 102 as shown in FIG. 1. The different phase (inductor) currents are combined by a combiner 105 into a total (inductor) current (Iph_total).

Operation of the power stage 100 is controlled via a pulse width modulation (PWM) signal generated by a controller 106. To this end, the controller 106 includes a PWM control unit 108 that generates a PWM signal for each phase 104 of the power stage 100. The PWM signal(s) are generated based on the difference between a reference voltage (Vref) provided to the switched mode buck converter and the load voltage (Vo). In some embodiments, the reference voltage corresponds to a voltage identification (VID) associated with the load 102. The VID determines the regulator set-point i.e. the target voltage of the regulator when the load current is zero.

The controller 106 also includes a first ADC 110 for sampling the load voltage (Vo) and a second ADC 112 for sampling the total inductor current (Iph_total) for all of the phases 104 of the power stage 100. The inductor current(s) are sampled at a lower rate (Fs_iadc) than the load voltage sampling rate (Fs). The controller 106 further includes an output current compensation unit 114 for estimating the output capacitor current ($\hat{i}_c$) based on the sampled load voltage. An AVP 116 generates an offset (Vavp) to the reference voltage (Vref) by an amount proportional to the sampled total inductor current (Isen). The AVP 116 generates the offset voltage based on the sampled total inductor current and the estimated capacitor current. The sampled total inductor current is presented to the AVP 116 by the output current compensation unit 114 as a scaled estimation (Vcom) of the capacitor current.

In one embodiment, the output current compensation unit 114 includes an output capacitor current estimator 118 which estimates the current of the output capacitor at the load voltage sampling rate (Fs) and not at the slower inductor current sampling rate (Fs_iadc). Estimating the output capacitor current at the faster load voltage sampling rate compensates for the latency involved in the AVP current loop which includes slower current ADC(s) 112, AVP filter(s) 120, etc. and enables the target voltage of the switching regulator react faster to the load changes, reducing the system latency.

In one embodiment, the output capacitor current estimator 118 estimates the current ($\hat{i}_c$) of the output capacitor as given by:

$$\hat{i}_c[k] = \frac{C}{T_s}(V_o[k] - V_o[k-1]) \rightarrow \hat{i}_c[z] = \frac{C}{T_s}\left(\frac{z-1}{z}\right) \times V_o \quad (1)$$

where Ts is the sampling period for the load voltage, C is the capacitance of the output capacitor and Vo is the sampled load voltage. The effect of the capacitor ESR (equivalent series resistance) is neglected in equation (1). The capacitor can be a single capacitor or a bank of capacitors in parallel.

In another embodiment, the output capacitor current estimator 118 accounts for the ESR of the capacitor when estimating the capacitor current. According to this embodiment, the output capacitor current estimator 118 is a digital filter having a coefficient set to a predetermined value representing the ESR of the output capacitor. The capacitor ESR and the capacitance (C) of the capacitor are provided to the output capacitor current estimator 118, which sets the filter coefficient (Kp_esr) as given by:

$$Kp\_esr = T_s/(ESR*C) \quad (2)$$

The output capacitor current ($\hat{i}_c$) is estimated based on the filter coefficient Kp_esr as given by:

$$\hat{i}_c[z] = \frac{C}{T_s}\left(\frac{1-z^{-1}}{1-(1-Kp\_esr)z^{-1}}\right) \times V_o \quad (3)$$

In equation (3), a more accurate estimate of the output capacitor current is generated based on the sampled load voltage (Vo) by compensating for the ESR of the capacitor. For a bank of capacitors connected in parallel, the output capacitor effective ESR is set by the zero location of the output capacitance effective impedance.

The output current compensation unit 114 further includes a gain element 122 that converts the estimated capacitor current ($\hat{i}_c$) to a voltage which is filtered by a dead zone filter 124 so that the voltage (Vcom) generated by the output current compensation unit 114 is non-zero only during transient load conditions i.e. only when a sudden change of the load current occurs. The filtered voltage (Vcom) is provided to the AVP 116.

The AVP 116 includes a gain block 126 for converting the sampled total inductor current (Isen) to a corresponding voltage. The voltage (Vcom) provided by the output current compensation unit 114 is subtracted from the voltage provided by the gain block 126 of the AVP 116. The resulting difference voltage is filtered by an AVP filter 120 which runs at the load voltage sampling rate (Fs), and subtracted from sampled load voltage (Vo). The difference between these two voltages constitutes an error signal (e) which is input to a compensator 128 of the controller 106. In one embodiment, the compensator 128 is a PID (proportional-integral-derivative) filter which implements a compensator transfer function with the error voltage (e) as an input and duty cycle as the output. As such, the duty cycle of the PWM signal(s) provided to the power stage 100 of the switching regulator is based on the offset (Vavp) generated by the AVP 116. The offset in turn is based on the output capacitor current estimate ($\hat{i}_c$) as previously described herein.

The PWM control unit 108 converts the digital duty cycle representation into a PWM waveform that controls the switch state of the power stage 100 i.e. the switch state of each phase 104 of the power stage 100. The transient response of the regulator is a function of the PWM duty cycle, and therefore is relatively fast because the output capacitor current estimate ($\hat{i}_c$) is generated based on the load voltage (Vo) which is sampled at a faster rate than the phase inductor current.

Figure 2:
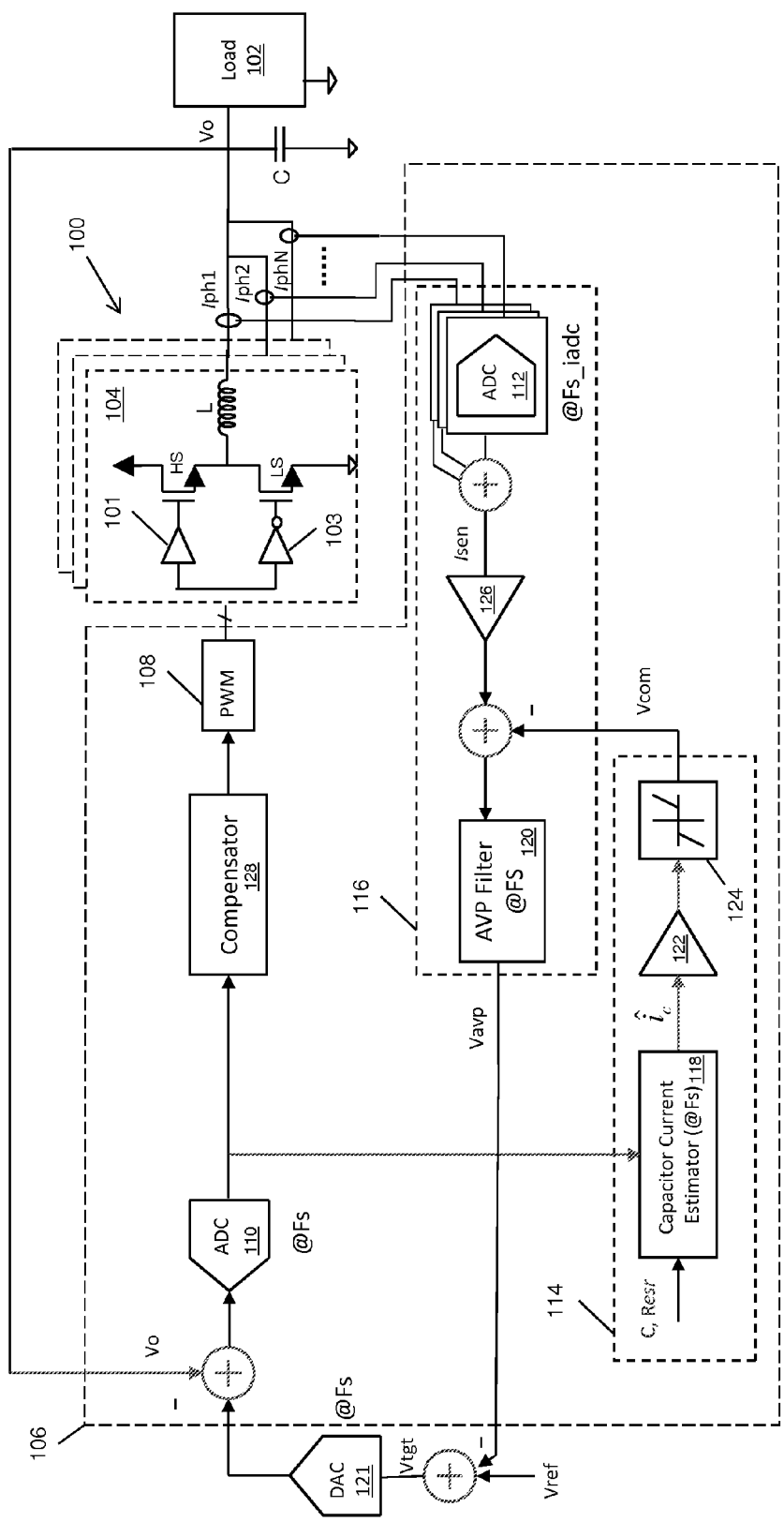
FIG. 2 illustrates a block diagram of an embodiment of a switching regulator having a fast load transient response.

FIG. 2 illustrates a block diagram of an embodiment of a switched mode buck converter which is similar to the embodiment shown in FIG. 1, however the AVP 116 has a separate ADC 112 for each phase current Iphm. The ADC outputs are summed to yield the total sensed phase current Isen which is used by the AVP 116 to generate the offset voltage (Vavp) as previously described herein. In contrast, the switched mode buck converter shown in FIG. 1 first combines the phase currents and then samples the total (combined) phase current using a single ADC 112. As such, the phase currents can be combined before or after the current ADC process. Also different between the embodiments of FIGS. 1 and 2 is whether the offset voltage (Vavp) generated by the AVP 116 is incorporated into the voltage feedback loop before or after the output voltage (Vo). In FIG. 1, Vavp is introduced into the voltage feedback loop after Vref is combined with Vo. In contrast, Vavp is combined with Vref and the difference voltage converted to the analog domain by a DAC (digital-to-analog converter) 121 according to the embodiment illustrated in FIG. 2. The resulting analog difference voltage is then combined with Vo and reconverted to the digital domain for further processing as previously described herein.

Figure 3:
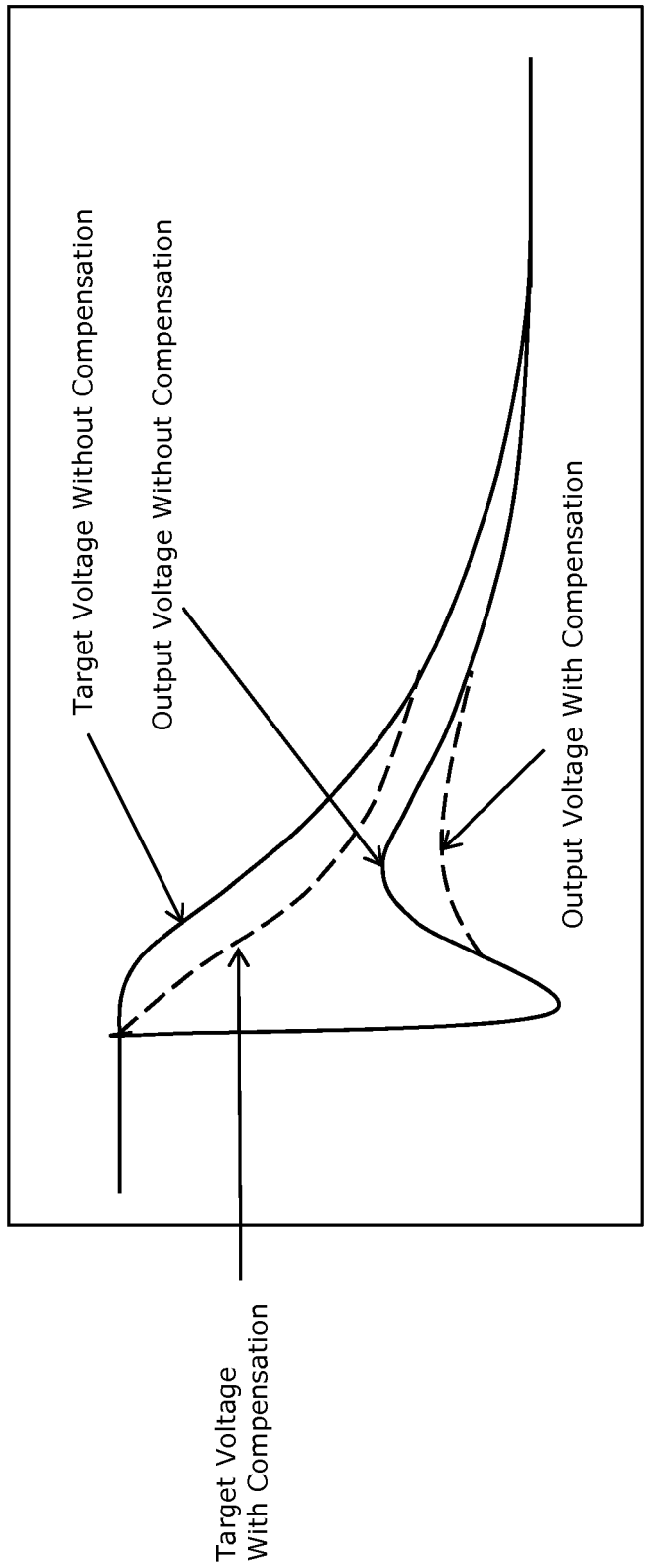
FIG. 3 is a plot diagram illustrating the output voltage and target voltage of a switching regulator with and without the fast load transient response compensation.

FIG. 3 is a plot diagram which shows the switching regulator output voltage (Vo) and target voltage (Vtgt) with and without the fast load transient response compensation described herein. The target voltage Vtgt corresponds to Vref−Vavp, and reacts quicker to transient load conditions with the fast load transient response compensation. In addition, the output voltage has less ring back with the fast load transient response compensation.

Figure 4:
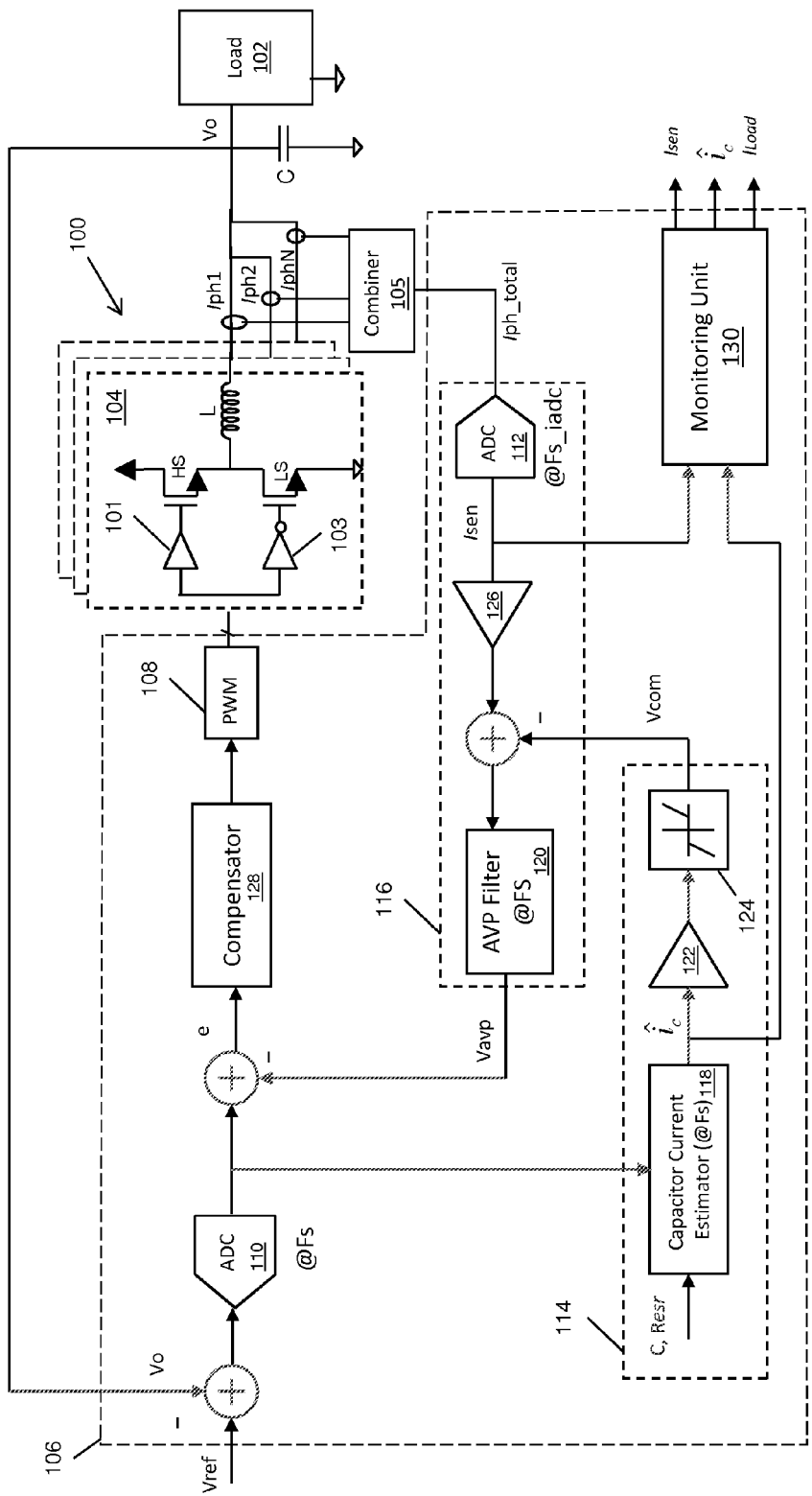
FIG. 4 illustrates a block diagram of an embodiment of a switching regulator having a fast load transient response and a monitoring unit.

FIG. 4 illustrates a block diagram of another embodiment of a switched mode buck converter which is similar to the embodiment shown in FIG. 1, however the controller 106 further includes a monitoring unit 130 according to the embodiment shown in FIG. 4. The monitoring unit 130 receives as inputs the sampled total inductor current (Isen) and the output capacitor current estimate ($\hat{i}_c$). The monitoring unit 130 can use the output capacitor current estimate for monitoring the operational status of the switching regulator, and provide useful information for better debugging faults. In one embodiment, the monitoring unit 130 provides the sampled total inductor current and the estimated capacitor current as external outputs of the switching regulator. The monitoring unit 130 can also provide the load current (ILoad) as an external output, where ILoad=$\hat{i}_c$−Isen.

Figure 5:
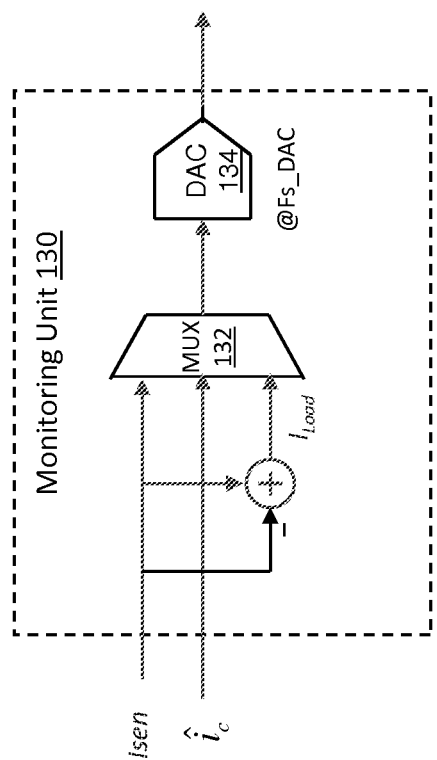
FIG. 5 illustrates a block diagram of an embodiment of the monitoring unit included in the switching regulator of FIG. 4.

FIG. 5 illustrates an embodiment of the monitoring unit 130. The monitoring unit 130 can be implemented digitally in a chip. The inputs to the monitoring unit 130 are the sampled total inductor current (Isen) from the AVP 116 and the capacitor current estimate ($\hat{i}_c$) from the output current compensation unit 114, both signals being available in the chip. The load current estimate (Iload) is equal to the sampled total inductor current minus the capacitor current estimate. A multiplexer 132 can be used for selecting one of these signals, or all three signals can be provided simultaneously. The multiplexer 132 is connected to a DAC (digital-to-analog converter) 134 which presents analog signal values external to the switching regulator. In the case all three signals are provided simultaneously, a DAC is provided for each signal. In each case, the DAC 134 runs at a rate (Fs_DAC) which is usually lower than the load voltage sampling rate (Fs).

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a switching regulator having a power stage coupled to a load through an inductor and a capacitor, the capacitor being a single capacitor or a bank of capacitors in parallel, the method comprising:
controlling operation of the power stage via a pulse width modulation (PWM) signal generated based on a difference between a reference voltage and a load voltage of the load;
sampling the load voltage;
sampling inductor current of the inductor at a lower rate than the load voltage;
estimating capacitor current of the capacitor based on the sampled load voltage;
generating a first modification term based on the sampled inductor current;
generating a second modification term based on the estimated capacitor current;
combining the first and the second modification terms to form a voltage offset;
adjusting the reference voltage by the voltage offset; and
adjusting the PWM signal applied to the power stage based on the adjusted reference voltage.

2. The method according to claim 1, wherein adjusting the PWM signal applied to the power stage based on the adjusted reference voltage comprises adjusting a duty cycle of the PWM signal based on the adjusted reference voltage.

3. The method according to claim 1, wherein generating the first modification term based on the sampled inductor current and combining the first and the second modification terms to form the voltage offset comprises:
generating a first voltage value from the sampled inductor current;
converting the estimated capacitor current to a second voltage value; and
subtracting the second voltage value from the first voltage value.

4. The method according to claim 1, further comprising accounting for an equivalent series resistance of the capacitor when estimating the capacitor current.

5. The method according to claim 4, wherein the capacitor current is estimated using a digital filter and the equivalent series resistance of the capacitor is accounted for when estimating the capacitor current by setting a coefficient of the digital filter to a predetermined value representing the equivalent series resistance.

6. The method according to claim 3, further comprising filtering the second voltage value so that the second voltage value is non-zero only during transient load conditions.

7. The method according to claim 1, wherein the capacitor current is estimated as a function of the sampled load voltage, the capacitance of the capacitor, the sampling frequency of the load voltage and an equivalent series resistance of the capacitor.

8. The method according to claim 1, further comprising providing at least one of the sampled inductor current, the estimated capacitor current and an estimate of the load current as external outputs of the switching regulator.

9. The method according to claim 1, wherein the switching regulator is a multi-phase switching regulator and the power stage comprises a plurality of phases each coupled to the load through a different inductor, wherein operation of each phase is controlled by a different PWM signal generated based on the difference between the reference voltage and the load voltage, wherein each inductor current is sampled at a lower rate than the load voltage, and wherein the first modification term is generated based on a sum of the sampled inductor currents.

10. A switching regulator, comprising:
a power stage for coupling to a load through an inductor and a capacitor; and
a controller operable to:
control operation of the power stage via a pulse width modulation (PWM) signal generated based on a difference between a reference voltage and a load voltage of the load;
sample the load voltage;
sample inductor current of the inductor at a lower rate than the load voltage;
estimate capacitor current of the capacitor based on the sampled load voltage;
generate a first modification term based on the sampled inductor current;
generate a second modification term based on the estimated capacitor current;
combine the first and the second modification terms to form a voltage offset;
adjust the reference voltage by the voltage offset; and
adjust the PWM signal applied to the power stage based on the adjusted reference voltage.

11. The switching regulator according to claim 10, wherein the controller is operable to adjust a duty cycle of the PWM signal based on the adjusted reference voltage.

12. The switching regulator according to claim 10, wherein the controller is operable to generate a first voltage value from the sampled inductor current, convert the estimated capacitor current to a second voltage value and subtract the second voltage value from the first voltage value to generate the adjusted reference voltage.

13. The switching regulator according to claim 10, wherein the controller is further operable to account for an equivalent series resistance of the capacitor when estimating the capacitor current.

14. The switching regulator according to claim 13, wherein the controller is operable to estimate the capacitor current using a digital filter and account for the equivalent series resistance of the capacitor when estimating the capacitor current by setting a coefficient of the digital filter to a predetermined value representing the equivalent series resistance.

15. The switching regulator according to claim 12, wherein the controller is further operable to filter the second voltage value so that the second voltage value is non-zero only during transient load conditions.

16. The switching regulator according to claim 10, wherein the controller is operable to estimate the capacitor current as a function of the sampled load voltage, the capacitance of the capacitor, the sampling frequency of the load voltage and an equivalent series resistance of the capacitor.

17. The switching regulator according to claim 10, wherein the controller is further operable to provide at least one of the sampled inductor current, the estimated capacitor current and an estimate of the load current as external outputs of the switching regulator.

18. The switching regulator according to claim 10, wherein the switching regulator is a multi-phase switching regulator and the power stage comprises a plurality of phases each coupled to the load through a different inductor and the same capacitor, wherein the controller is operable to control operation of each phase by a different PWM signal generated based on the difference between the reference voltage and the load voltage, wherein the controller is operable to sample each inductor current at a lower rate than the load voltage, and wherein the controller is operable to generate the first modification term based on a sum of the sampled inductor currents.

19. The switching regulator according to claim 10, wherein the capacitor is a single capacitor or a bank of capacitors in parallel.

20. A multi-phase switching regulator, comprising:
a power stage comprising a plurality of phases each of which is coupled to a load through a different inductor and an output capacitor; and
a controller operable to sample a load voltage of the load, sample a total inductor current for all of the phases at a lower rate than the load voltage, estimate output capacitor current of the capacitor based on the sampled load voltage, generate a first modification term based on the sampled total inductor current, generate a second modification term based on the estimated capacitor current, combine the first and the second modification terms to form a voltage offset.

21. The multi-phase switching regulator according to claim 20, wherein the controller is further operable to provide the sampled total inductor current and the estimated output capacitor current as external outputs of the multi-phase switching regulator.

22. The multi-phase switching regulator according to claim 20, wherein the output capacitor is a single capacitor or a bank of capacitors in parallel.

* * * * *